W. E. GRAHAM.
LAWN MOWER.
APPLICATION FILED JULY 27, 1912.
1,067,244.
Patented July 15, 1913.
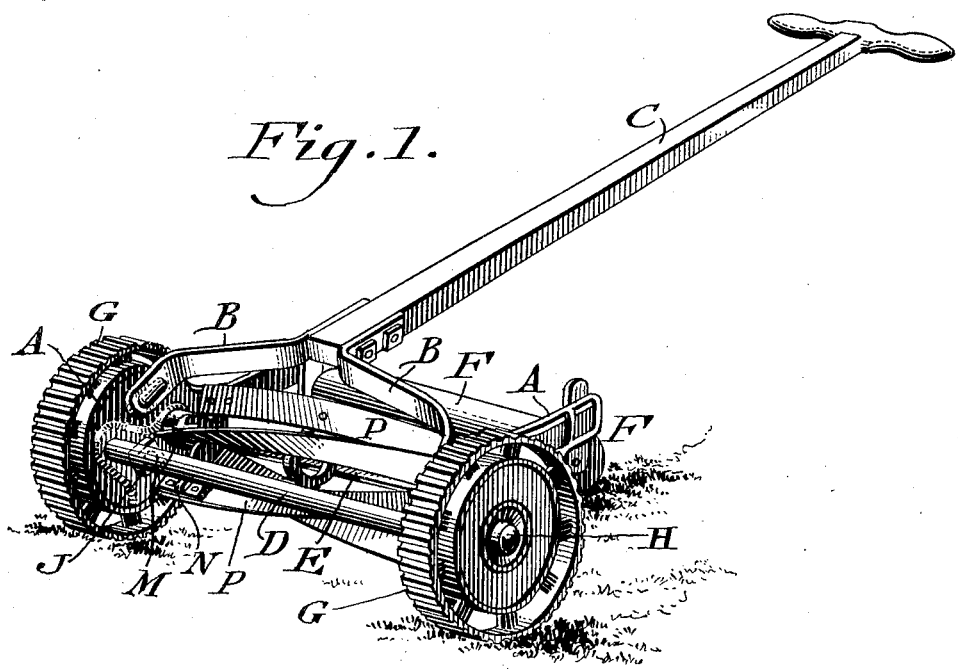
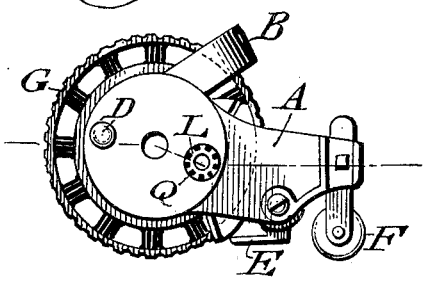
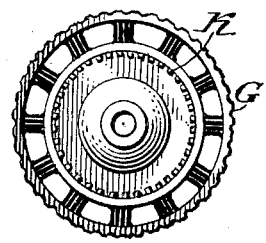
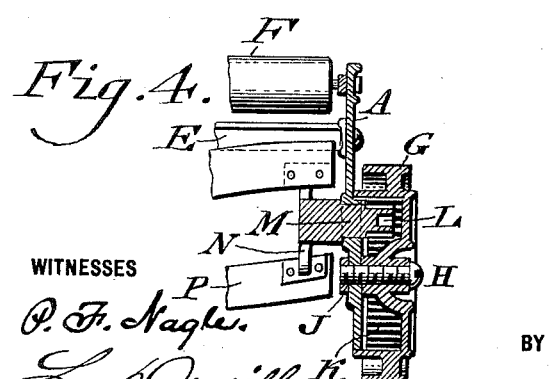
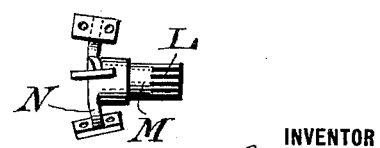
WITNESSES
P. F. Nagle.
L. Douville.
INVENTOR
Walter E. Graham
Wiedersheim & Fairbanks
ATTORNEYS

UNITED STATES PATENT OFFICE.

WALTER E. GRAHAM, OF PHILADELPHIA, PENNSYLVANIA.

LAWN-MOWER.

1,067,244.  Specification of Letters Patent.  Patented July 15, 1913.

Application filed July 27, 1912. Serial No. 711,785.

*To all whom it may concern:*

Be it known that I, WALTER E. GRAHAM, a citizen of the United States, residing in the city and county of Philadelphia, State of Pennsylvania, have invented a new and useful Lawn-Mower, of which the following is a specification.

My invention consists of a lawn mower having rotary knives and means for supporting and operating the same involving members of simple, strong and inexpensive construction and adapting the mower to be serviceable as a toy or amusement while having a certain cutting ability as will be hereinafter set forth.

The invention is satisfactorily illustrated in the accompanying drawing, but the important instrumentalities thereof may be varied, and so it is to be understood that the invention is not limited to the specific arrangement and organization shown and described.

Figure 1 represents a perspective view of a lawn mower embodying my invention. Fig. 2 represents a side elevation of a detached portion thereof. Fig. 3 represents a side elevation of one of the wheels of the mower including an internally toothed spur gear thereon. Fig. 4 represents a horizontal section of a portion of the mower. Fig. 5 represents a perspective view of detached members embodying the invention.

Similar letters of reference indicate corresponding parts in the figures.

Referring to the drawings:—A designates the side plates of the frame of the lawn mower, the same having attached to it the forks B of the handle member C and being connected by the transversely extending rod D. E designates the stationary bed knife which is secured to said plates A, and F designates the roller on which the mower may be run, the same being mounted on said plates adjacent to said bed knife E.

G designates the wheels of the mower, the same being mounted on the plates A by the screws H, which pass through the hubs of said wheels and through said plates and are held in place by the nuts J which are adapted to tighten against the inner sides of said plates.

The wheels G are formed with internally-toothed or spur gears K with which mesh the pinions L, the latter extending outwardly from the shafts M on whose inner ends are the hubs of the spiders N to whose arms are riveted or otherwise secured the rotary blades P, it being seen that the pinions L are exterior of the plates A, and the spiders N interior thereof, while the shafts M freely occupy openings Q eccentric in said plates A, said shafts thus and consequently said pinions and spiders having their bearings on said plates at said openings. The hubs of the spiders form shoulders on the shafts M the same resting freely against the sides of the plates A and preventing lateral play of said shafts and consequently of the blades P.

The operation is as follows:—The mower is moved by the handle and it runs on the wheels G, the latter rotating and causing their spur gears K which follow said wheels G, to rotate the pinions L, the motion being imparted to the shafts M and the spiders N, and consequently to the blades P, the latter thus rotating adjacent to the bed knife E. It will be seen that each pinion L, shaft M, spider N are continuous of each other and of integral construction, and said shaft has its bearing on the plate A, so as to rotate thereon while supporting the spider and pinion and communicating its motion to the latter and consequently to the blades P, said construction being simple, strong and inexpensive in its nature and readily cast or otherwise formed as one, it being evident that the pinions L and the spiders N are not weakened by boring, but retain their intact condition and so preserve their strength this being assisted by the integral nature and jointless connection of each pair of spiders, shafts and pinions with each other.

Having thus described my invention what I claim as new and desire to secure by Letters Patent, is:—

1. In a lawn mower of the character stated, a frame, a running wheel for the mower mounted on a member of said frame, an internally-toothed gear on said wheel, a pinion adapted to mesh with said gear, a shaft carrying said pinion and occupying an opening in a member of said frame and a blade-carrying arm connected with said shaft, and having a hub which forms a shoulder adapted to bear freely against the side of said frame member, said pinion, shaft, hub and arm being integral.

2. A lawn mower of the character stated composed of a frame, a rotary blade, a bed knife, an arm carrying said blade, a shaft connected with said arm, a pinion on said shaft, said shaft having its bearings on a member of said frame, a running wheel for the mower mounted on said frame member and an internally-toothed gear, said pinion and gear being adapted to intermesh, said pinion, shaft and arm being integral, the portion of said shaft between said pinion and arm having its bearings directly on said frame member.

WALTER E. GRAHAM.

Witnesses:
N. F. CRESSMAN,
W. K. JONES.

Copies of this patent may be obtained for five cents each, by addressing the "Commissioner of Patents, Washington, D. C."